United States Patent
Takada et al.

[11] Patent Number: 6,064,551
[45] Date of Patent: May 16, 2000

[54] MAGNETORESISTANCE EFFECT TYPE MAGNETIC HEAD

[75] Inventors: Akio Takada; Takuji Shibata; Moriaki Abe; Tadayuki Honda; Kenji Yazawa; Hiroaki Narisawa, all of Miyagi, Japan

[73] Assignee: Sony Corporation, Tokyo, Japan

[21] Appl. No.: 09/030,377

[22] Filed: Feb. 25, 1998

[30] Foreign Application Priority Data

| Feb. 27, 1997 | [JP] | Japan | 9-043368 |
| May 16, 1997 | [JP] | Japan | 9-127492 |
| Jul. 18, 1997 | [JP] | Japan | 9-193569 |

[51] Int. Cl.⁷ ................................................ G11B 5/39
[52] U.S. Cl. .............................................. 360/113
[58] Field of Search .................................... 360/113

[56] References Cited

U.S. PATENT DOCUMENTS

| 5,270,893 | 12/1993 | Sasaki et al. | 360/113 |
| 5,351,158 | 9/1994 | Shibata | 360/113 |
| 5,420,736 | 5/1995 | Heim et al. | 360/113 |
| 5,424,890 | 6/1995 | Suyama et al. | 360/113 |
| 5,546,254 | 8/1996 | Gill | 360/113 |
| 5,549,978 | 8/1996 | Iwasaki et al. | 428/692 |
| 5,557,491 | 9/1996 | Gill et al. | 360/113 |
| 5,653,013 | 8/1997 | Gill et al. | 29/603.14 |
| 5,666,248 | 9/1997 | Gill | 360/113 |
| 5,694,275 | 12/1997 | Watanabe et al. | 360/113 |
| 5,696,656 | 12/1997 | Gill et al. | 360/113 |
| 5,739,990 | 4/1998 | Ravipati et al. | 360/113 |
| 5,828,530 | 10/1998 | Gill et al. | 360/113 |
| 5,872,689 | 2/1999 | Gill | 360/113 |
| 5,914,839 | 6/1999 | Matsuzono et al. | 360/113 |

*Primary Examiner*—William Klimowicz
*Attorney, Agent, or Firm*—Hill & Simpson

[57] ABSTRACT

The present invention provides a high quality magnetoresistance effect type magnetic head having an increased reproduction output and capable of applying a uniform bias magnetic field to a magnetoresistance effect layer without increasing an impedance. The magnetoresistance effect type magnetic head according to the present invention includes: a magnetic layer 11 magnetized approximately in a vertical direction to a plane 14 opposing to a magnetic recording medium; a non-magnetic insulation layer 12 formed on the magnetic layer 11; and a magnetoresistance effect layer 13 formed on the non-magnetic insulation layer 12 and exhibiting the magnetoresistance effect. In the longitudinal type magnetoresistance effect type magnetic head according to the present, the detection current supplied to a magnetoresistance element is prevented from flowing into a hard magnetic film to lower the head reproduction output.

8 Claims, 8 Drawing Sheets

EXTERNAL MAGNETIC FIELD H

MAGNETORESISTANCE EFFECT TYPE MAGNETIC HEAD

BACKGROUND OF THE INVENTION

1. Field of the Invention

The present invention relates to magnetoresistance effect type magnetic head for detecting a reproduction signal by way of the magnetoresistance effect which can preferably be used in a hard disc apparatus and the like.

2. Description of the Prior Art

In a magnetic recording apparatus such as a hard disc apparatus, a higher recording density is desired in order to increase the capacity. To cope with this, in recent years, a magnetoresistance type magnetic head (hereinafter, referred to as an ME head) has been employed which can be preferably for a narrower track. This MR head utilizes that a resistance ratio of a magnetic film is changed by a magnetic field from a magnetic recording medium and detects this resistance change as a reproduction output voltage. According to this principle, an electric resistance value is indicated in accordance to a magnetic flux even if the medium is in a halt state and this principle is used for a reading head of a hard disc.

The MR head employs a magnetoresistance element (hereinafter, referred to as an MR element) for reproducing a magnetic data recorded. In order to enhance the output of the MR element and improve the non-linearity, it is necessary to apply a uniform bias magnetic field of an appropriate size.

The inventor of the present invention has suggested a magnetoresitanceo effect type magnetic head for orienting the longitudinal direction of the MR head in a vertical direction with respect to a surface opposing to the medium (hereinafter, referred to as a longitudinal type MR head). In this longitudinal type MR head, in order to apply a bias magnetic field, an electric current is supplied to a bias current line is arranged in the vicinity of the magnetoresistance effect layer, so as to apply a uniform bias magnetic field to the magnetoresistance effect layer. This is a so-called bias application method using a bias current.

The aforementioned bias application method uses a bias current method of series connection type in which the MR element and the bias current terminal are connected in series. Consequently, a sense current used for detection of a reproduction output can also be used for applying a bias magnetic field, which is preferable for efficiency. That is, the sense current can also be used as the bias current.

However, in a case when the sense current is used as the bias current as has been described above, the MR element is connected in series to the bias current terminal, which brings about a problem that the impedance is increased.

SUMMARY OF THE INVENTION

It is therefore an object of the present invention to provide an MR head of high quality capable of applying a uniform bias magnetic field to a magnetoresistance effect layer without increasing the impedance and having an improved reproduction output.

The magnetoresistance effect type magnetic head according to the present invention includes: a magnetic layer magnetized approximately in a vertical direction to a plane opposing to a magnetic recording medium; a non-magnetic insulation layer formed on the magnetic layer; and a magnetoresistance effect layer formed on the non-magnetic insulation layer and exhibiting the magnetoresistance effect.

Moreover, it is preferable that the magnetic layer include at least an antiferromagnetic film and a soft magnetic film. The magnetic layer may have a hard magnetic film.

Furthermore, it is preferable that a magnetic layer be arranged at both sides of a magnetoresistance effect layer, and this magnetic layer have a hard magnetic film.

The magnetoresistance effect type magnetic head (hereinafter, referred to as an MR head) having the aforementioned configuration includes a magnetic layer magnetized approximately in a vertical direction to a plane opposing to a magnetic recording medium and a magnetoresistance effect layer exhibiting the magnetoresistance effect and is capable applying a bias magnetic field to the magnetoresistance effect layer by using the magnetic field generated from the magnetic layer. Thus, the MR head according to the present invention does not use the bias application method by way of a bias current and accordingly, can apply a uniform bias magnetic field to the magnetoresistance effect layer, preventing increase of impedance.

Furthermore, in the MR head according to the present invention, the magnetic layer includes at least a soft magnetic film and an antiferromagnetic film so that the magnetization direction of the soft magnetic film is fixed by the antiferromagnetic film. Thus, the antiferromagnetic film prevents rotation of the magnetization direction of the soft magnetic film due to the magnetic field generated by the sense current used for obtaining a reproduction output.

Moreover, in the MR head according to the present invention, a magnetic layer is arranged at both sides of the magentoresistance effect layer, which nullifies the antimagnetic field generated at the end of the magnetoresistance effect layer, stabilizing the magnetization of the magnetoresistance effect layer.

According to another aspect of the present invention, the MR head includes: a magnetoresistance effect element formed as an approximately rectangular thin film element having a first edge positioned in the vicinity of a magnetic recording track, a second edge opposing to the first edge, and third and fourth edges in the width direction of the magnetic recording track; a pair of hard magnetic films each connected to the third and the fourth edges of the magnetoresistance effect element, for a horizontal bias; and a pair of electrode films each connected electrically to the first and the second edges of the magnetoresistance effect element, wherein the hard magnetic film is formed from a hard magnetic material having a specific resistance of 0.1 ocm or above.

The present invention also provides a method for producing a magnetoresistance element and a hard magnetic film in a magnetoresistance effect type magnetic head including: a magnetoresistance effect element formed as an approximately rectangular thin film element having a first edge positioned in the vicinity of a magnetic recording track, a second edge opposing to the first edge, and third and fourth edges in the width direction of the magnetic recording track; a pair of hard magnetic films each connected to the third and the fourth edges of the magnetoresistance effect element, for a horizontal bias; and a pair of electrode films each connected electrically to the first and the second edges of the magnetoresistance effect element, the method including: a step of forming a magnetoresistance material film on a substrate on which a support layer has been formed to support the magnetoresistance element and the hard magnetic film; a step of forming a first resist pattern on the magnetoresistance material film so as to cover a region corresponding at least the magnetoresistance element and to define at least a boundary between the magnetoresistance element and the hard magnetic film; a step of carrying out etching for the first resist pattern to remove a portion of the magnetoresistance material film not covered by the first resist pattern; a step of forming a hard magnetic film having a specific resistance of 0.1 ocm or above on the substrate having the portion of the magnetoresistance material film covered by the first resist pattern, so that the magnetoresistance material film is bonded to the hard magnetic film at the boundary between the magnetoresistance element and the hard magnetic film; a step of carrying out the lift-off processing so as to remove the first resist pattern together with the portion of the hard magnetic film formed on the first resist pattern; a step of forming a second resist pattern to cover a region corresponding to the magnetoresistance element and the hard magnetic film; and a step of carrying out an etching process for the second resist pattern and a resist removal processing.

Moreover, the present invention provides a method for forming a magnetoresistance element and a hard magnetic film in a magnetoresistance effect type magnetic head including: a magnetoresistance effect element formed as an approximately rectangular thin film element having a first edge positioned in the vicinity of a magnetic recording track, a second edge opposing to the first edge, and third and fourth edges in the width direction of the magnetic recording track; a pair of hard magnetic films each connected to the third and the fourth edges of the magnetoresistance effect element, for a horizontal bias; and a pair of electrode films each connected electrically to the first and the second edges of the magnetoresistance effect element, the method including: a step of forming a magnetoresistance material film on a substrate on which a support layer has been formed to support the magnetoresistance element and the hard magnetic film; a step of forming a first resist pattern on the magnetoresistance material film so as to cover a region corresponding at least the magnetoresistance element and to define at least a boundary between the magnetoresistance element and the hard magnetic film; a step of carrying out etching for the first resist pattern to remove a portion of the magnetoresistance material film not covered by the first resist pattern; a step of forming a magnetoresistance material film on the substrate having the portion of the magnetoresistance material film covered by the first resist pattern, so that the magnetoresistance material film is bonded to the hard magnetic film at the boundary between the magnetoresistance element and the hard magnetic film; a step of carrying out the lift-off processing so as to remove the first resist pattern together with the portion of the hard magnetic film formed on the first resist pattern; a step of forming a second resist pattern to cover a region corresponding to the magnetoresistance element and the hard magnetic film; and a step of carrying out an etching process for the second resist pattern and a resist removal processing.

The present invention provides a longitudinal type MR head capable of completely nullifying the problem of short-circuit between the electrode film electrically connected to the MR element and the magnetic recording medium. Because a material having a large specific resistance is used for the hard magnetic film, leak of the detection current supplied to the MR element, into the hard magnetic film can be substantially prevented, which in turn prevents lowering of the head reproduction output.

DETAILED DESCRIPTION OF THE PREFERRED EMBODIMENTS

Description will now be directed to embodiments of the present invention with reference to the attached drawings.

Figure 1:
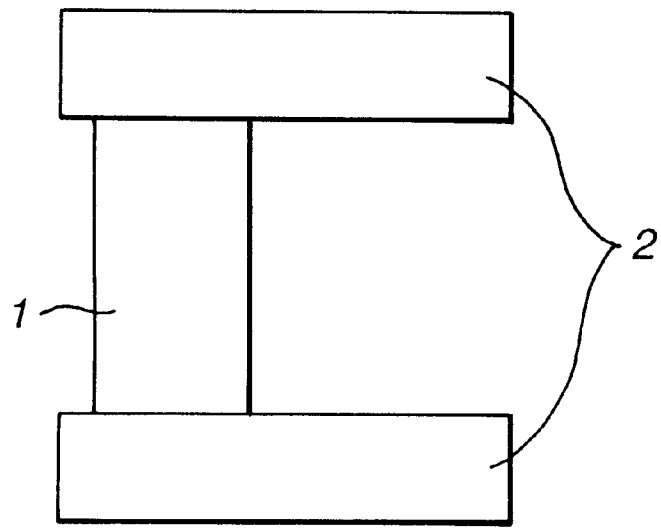
FIG. 1 schematically shows a basic configuration example of a magnetoresistance effect type magnetic head (hereinafter, referred to as an MR head).

FIG. 1 shows a basic configuration of a magnetoresistance effect type magnetic head (hereinafter, referred to as an MR head) including: a magnetoresistance effect element 1 having a magnetoresistance effect layer which changes its resistance ratio according to the magnetic field force; and electrodes 2 arranged at the end of this magnetoresistance effect element (hereinafter, referred to as an MR element). The MR element 1 is supplied with sense current through these electrodes 2, so as to detect a resistance change in the MR element 1. According to this resistance change, a reproduction output is obtained. In such a magnetoresistance effect type magnetic head, the reproduction output does not depend on a medium velocity and it is possible to obtain a high reproduction output even if the medium velocity is small.

Figure 2:
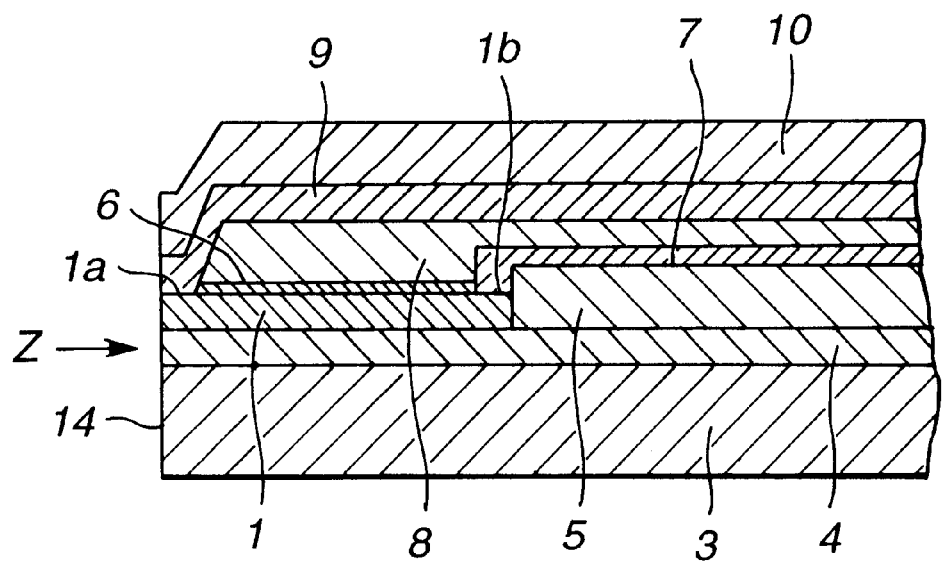
FIG. 2 is a cross sectional view showing an essential portion of an example of an MR head.

The MR head according to the present invention is an MR head including an MR element 1 having a magnetoresistance effect layer. As shown in FIG. 2, the MR head includes: a lower layer shield 3; a lower gap layer 4 formed on the lower layer shield 3; the MR element 1 and a non-magnetic insulation layer 5 formed on the lower gap layer 4; a protection layer 6 formed to cover the MR element 1 excluding a front end 1a and a rear end 1b; a sense current conductive layer 7 formed over the rear end 1b of the MR element 1 and the non-magnetic insulation layer 5; a non-magnetic insulation layer 8 formed over the MR element 1 and the sense current conductive layer 7; an upper gap layer 9 formed over the front end 1a of the MR element 1 and the non-magnetic insulation layer 8 so as to be connected to the front end 1a of the MR element 1; and an upper layer shield 10 formed on the upper gap layer 9.

In the aforementioned MR head, the lower layer shield 3 and the upper layer shield 10 are made from a magnetic material; the lower gap layer 4 is made from a non-magnetic insulator; and the upper gap layer 9 is made from a non-magnetic conductive material. The lower layer shield 3, the upper layer shield 10, the lower gap layer 4, and the upper gap layer 9 function so that a signal magnetic field from the magnetic recording medium other than for reproduction will not be brought into the MR element. That is, the lower layer shield 3 and the upper layer shield 10 are arranged so as to sandwich the MR element via the lower gap layer 4 and the upper gap layer 9, and the signal magnetic field from the recording medium other than for reproduction is led to the lower layer shield 3 and the upper layer shield 10, so that only the magnetic field for reproduction is brought into the MR element 1.

On the other hand, the sense current conductive layer 7 and the upper gap layer 9 serve as a pair of electrodes, each connected to the ends of the MR element 1 for supplying sense current to the MR element. That is, the MR element 1 has the rear end 1b which is electrically connected to the sense current conductive layer 7 and the front end 1a which is electrically connected to the upper gap layer 9. When detecting a signal magnetic field from the magnetic recording medium, a sense current is applied through these to the MR element 1.

Here, the MR element 1, as will be detailed later, includes a magnetic layer, a non-magnetic insulation layer, and a magnetoresistance effect layer which are successively formed.

In the MR head having the aforementioned configuration, the sense current conductive layer 7 and the upper gap layer 9 serve as a pair of electrodes and a sense current flows into the MR element 1. This MR head utilizes that a resistance ratio in the magnetoresistance effect layer in the MR element 1 is changed by the magnetic field from the magnetic recording medium, and detects this resistance change as a reproduction output.

Figure 3:
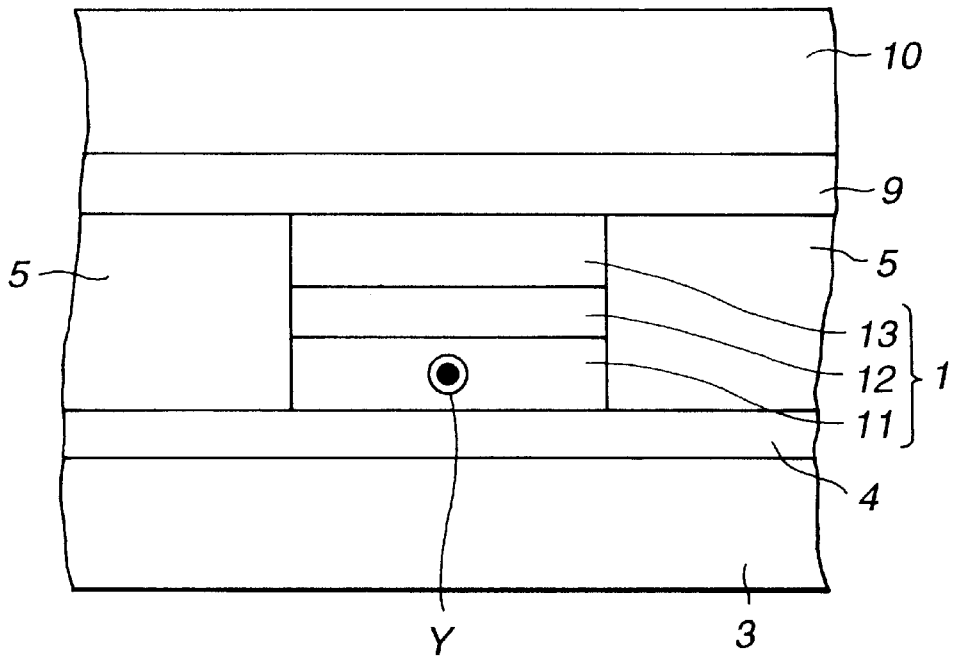
FIG. 3 is a front view of an essential portion of an MR head according to an embodiment of the present invention viewed from a surface opposing to a medium.

FIG. 3 shows the aforementioned MR head viewed from a plane opposing to the magnetic recording medium as indicated by an arrow Z in FIG. 2. As shown in FIG. 3, the MR element 1 includes a magnetic layer 11, a non-magnetic insulation layer 12, and a magnetoresistance effect layer 13 which are successively formed.

This MR element 1 is embedded in a non-magnetic insulator 5 so as to be sandwiched by the non-magnetic insulator from the both sides. Here, the non-magnetic insulator 5 is exposed on a plane opposing to the medium and is preferably formed from a material having an excellent running characteristic such as $Al_2O_3$, $SiO_2$, $SiN_x$ ($Si_3N_4$ and the like).

This MR element is connected to the electrodes at the upper surface of the MR element. That is, as shown in FIG. 2, at the front end 1a of the MR element 1, the upper surface of the magnetoresitance effect layer 13 is electrically connected to the upper gap layer 9, whereas at the rear end 1b of the MR element 1, the upper surface of the magnetoresistance effect layer 13 is electrically connected to the sense current conductive layer 7. Here, the magnetic layer 11 is insulated by the non-magnetic insulator 5 as shown in FIG. 3, and has the upper surface insulated by the non-magnetic insulation layer 12, so that no sense current flows into the magnetic layer 11.

Moreover, in the MR head using such an MR element 1, a static magnetic connection is generated between the magnetoresistance effect layer 13 and the magnetic layer 11, which increases the magnetic stability of the magnetoresistance effect layer 13, reducing the Barkhausen noise.

In this MR head, the sense current is supplied only to the magnetoresistance effect layer 13, which alone serves as a magnetic sensor. Consequently, in this MR head, the thickness of the portion serving for a reproduction output is the thickness of the magnetoresistance effect layer 13. Therefore, in this MR head, it is possible to reduce by half the thickness serving for the reproduction output in comparison to an MR head in which a sense current is also fed to a magnetic layer 11. Thus, this MR head enables to obtain a high reproduction output.

Especially, the magnetic layer 11 used in the MR element 1 according to the present invention is magnetized, as shown in FIG. 3, by a magnetic field applied in the direction indicated by Y in the figure which is approximately vertical to the plane 14 opposing to the magnetic recording medium in FIG. 2. It should be noted that this magnetization direction may be opposite to the direction indicated in FIG. 3, i.e., a direction from the opposite plane not facing the magnetic recording medium, toward the inside of the MR head. Here, the magnetic layer 11 is connected by static magnetism to the magnetoresistance effect layer 13, thus increasing the magnetic stability of the magnetoresistance effect layer 13.

Moreover, the magnetoresistance effect layer 13, for example, may be a single film made from a NiFe or the like and having the magnetoresistance effect. Alternatively, the magnetoresistance effect layer 13 may be made from a lower film made from Ta or the like and a magnetoresistance effect film of NiFe or the like formed on the lower film.

Next, explanation will be given on another example of the MR element used in the MR head according to the present invention with reference to FIG. 4.

Figure 4:
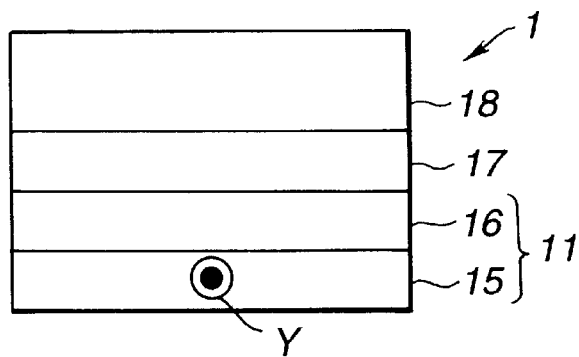
FIG. 4 is a front view of an essential portion of an MR head according to another embodiment of the present invention viewed from a surface opposing to a medium.

In the MR element 1 of the MR head according to the present invention, as shown in FIG. 4, it is preferable that the magnetic layer 11 consist of a soft magnetic film 15 and an antiferromagnetic film 16, and that the soft magnetic film 15, the antiferromagnetic film 16, the non-magnetic insulation layer 17, and the magnetoresistance effect layer 18 be successively formed. It should be noted that the soft magnetic film 15 and the antiferromagnetic film 16 may be formed in the opposite order, i.e., the soft magnetic film 15 may be formed on the antiferromagnetic film 16.

Here, the soft magnetic film 15 is magnetized by a magnetic field in the Y direction in FIG. 4, which is approximately vertical to the plane 14 opposing to a magnetic recording medium. As the material for the soft magnetic film 15, there can be exemplified soft magnetic substances such as Co, CoFe, NiFe, NiFe—X (X=Ta, Cr, Nb) and the like.

On the other hand, the antiferromagnetic film 16 can prevent rotation of the magnetization direction of the soft magnetic film 15 while being affected by a magnetic field generated by a current flowing to the magnetoresistance effect layer 18. Thus, the magnetization direction of the soft magnetic film 15 is fixed and made stable. As the material for the antiferromagnetic film 16, there can be exemplified FeMn, IrMn, CrMnPt, NiO, and the like. Especially when the soft magnetic film 15 is formed on the antiferromagnetic film 16, the material of the antiferromagnetic film 16 is preferably NiO.

Figure 5:
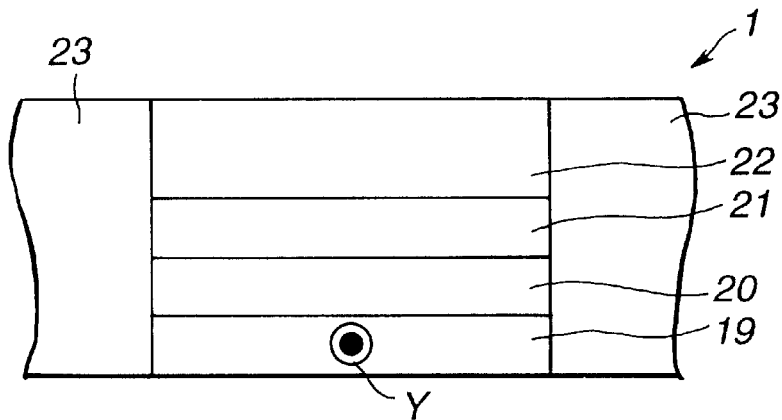
FIG. 5 is a front view of an essential portion of an MR head according to still another embodiment of the present invention viewed from a surface opposing to a medium.

Furthermore, FIG. 5 shows another example of the MR element 1 in the MR head according to the present invention.

In the same way as the MR element 1 shown in FIG. 4, the MR element 1 in the MR head according to the present invention preferably has a configuration that the magnetic layer 11 consists of a soft magnetic film 19 and an antiferromagnetic film 20 and that the soft magnetic film 19, the antiferromagnetic film 20, the non-magnetic insulation layer 21, and the magnetoresistance effect layer 22 are successively formed. It is more preferable that as shown in FIG. 5, the magnetoresistance effect layer 22 of a rectangular shape is sandwiched by a magnetic layer 23.

The magnetic layer 23 nullifies the antimagnetic field generated at the end of the magnetoresistance effect film 22, thus stabilizing the magnetization direction of the magnetoresistance effect film 22. As the aforementioned magnetic layer 23 of the MR element 1 in the MR head according to the present invention, it is preferable to use a hard magnetic layer made from hard magnetic substances such as CoPt, CoPtCr, CoNi, or the like. It is more preferable that the hard magnetic layer have a resistance to define a resistance ratio with the magnetoresistance effect film 22 as about $1 \times 10^6$ or more. This also can prevent loss of the sense current from the magnetic layer, which is to be supplied to the magnetoresistance effect layer 22.

Figure 6:
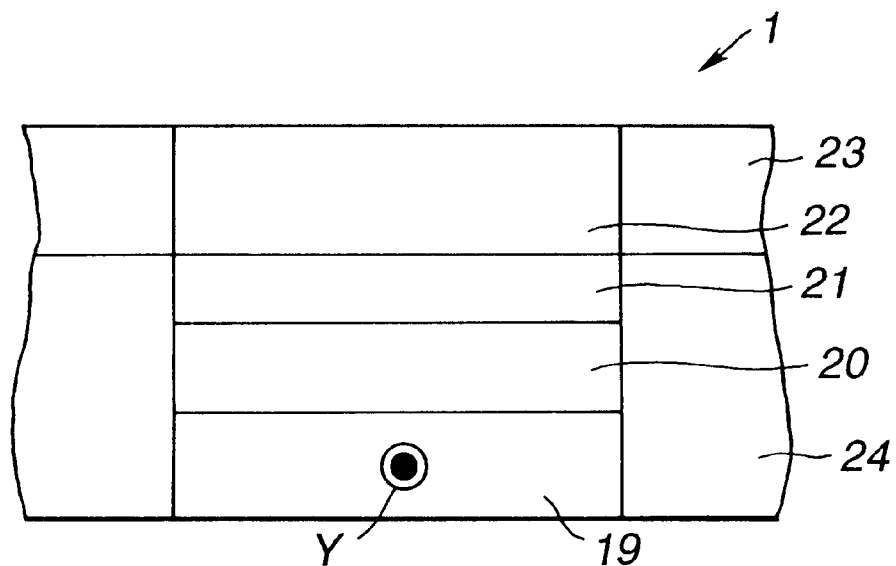
FIG. 6 is a front view of an essential portion of an MR head according to yet another embodiment of the present invention viewed from a surface opposing to a medium.

It should be noted that the magnetic layer 23 may not cover the entire side surfaces of the MR element 1 as in FIG. 5. As shown in FIG. 6, it is sufficient that the magnetic layer 23 is formed to cover at least the side surfaces of the magnetoresistance effect layer 22, so as to stabilize the magnetization direction of the magnetoresistance effect layer 22. In this case, it is preferable that the soft magnetic film 19, the antiferromagnetic film 20, and the non-magnetic insulation layer 21 be sandwiched by a non-magnetic insulator 24.

Figure 7:
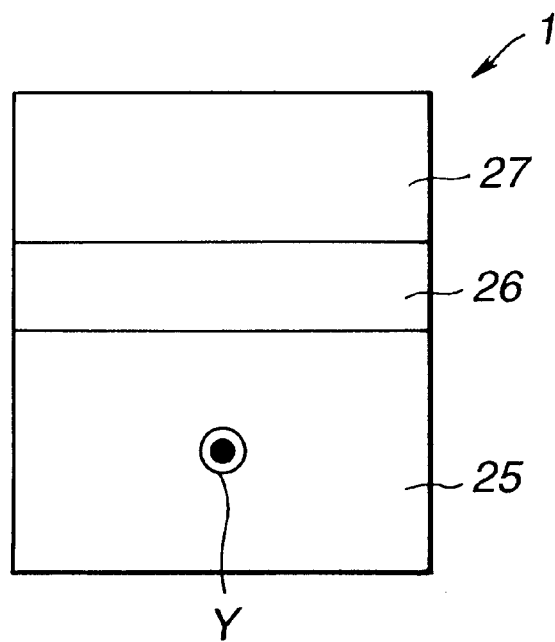
FIG. 7 is a front view of an essential portion of an MR head according to yet still another embodiment of the present invention viewed from a surface opposing to a medium.

It should be noted that in the MR element 1 in the MR head according to the present invention, as shown in FIG. 7, it is also possible that the hard magnetic layer 25, the non-magnetic insulation layer 26, and the magnetoresistance effect layer 27 are successively formed in this order. The material used for the hard magnetic layer 26 in this case is same as the aforementioned hard magnetic layer 23.

The MR element 1 in the MR head according to the present invention having the aforementioned configuration is subjected to a bias magnetic field as follows. Here, explanation will be given for a case when the MR element 1, as shown in FIG. 5, includes the soft magnetic film 19, the antiferromagnetic film 20, the insulation film 21, and the magnetoresistance effect film 22 successively formed and sandwiched from sides by a magnetic layer 23 of a hard magnetic film.

Figure 8:
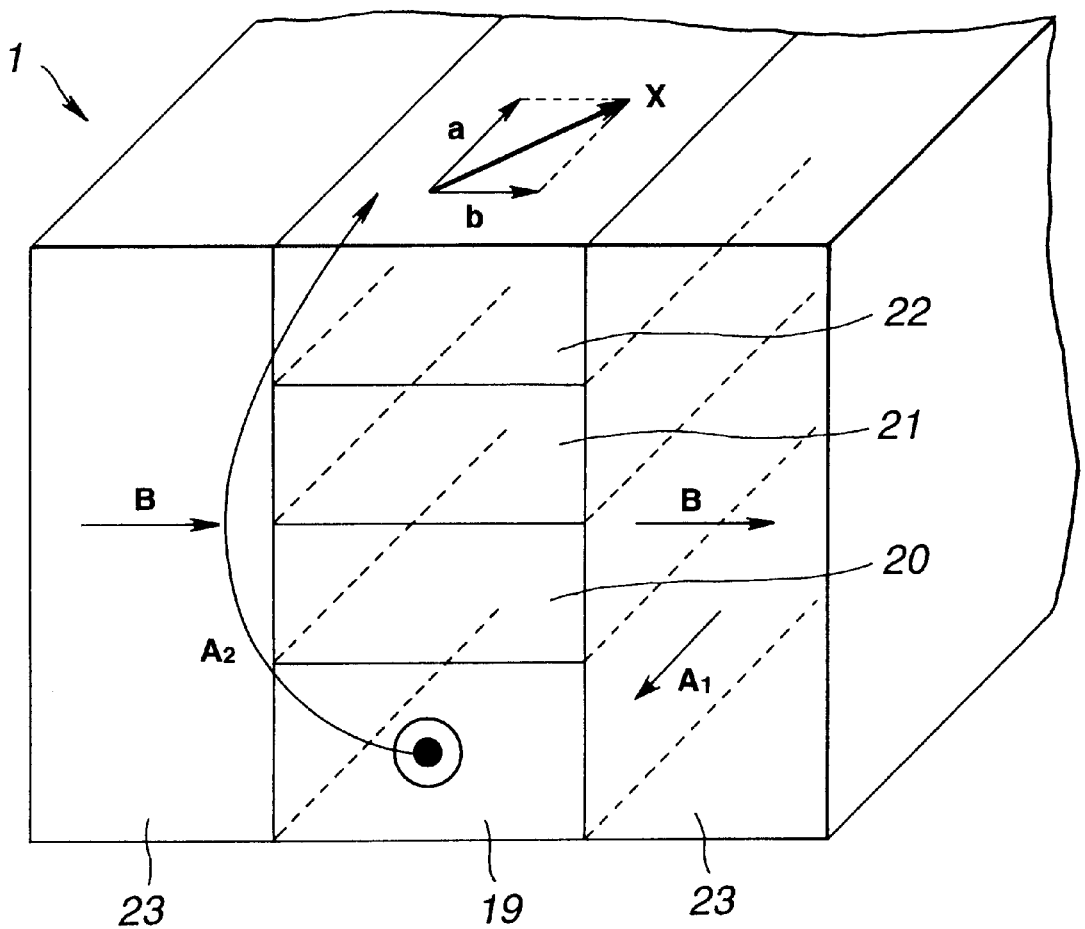
FIG. 8 is a perspective view showing an MR head according to an embodiment of the present invention.

The soft magnetic film 19 has its magnetization direction fixed by the antiferromagnetic film 20 which has been annealed. Here, the magnetization direction of the soft magnetic film 19 is approximately in the vertical direction to the plane opposing to the magnetic recording medium. For example, in the direction indicated by $A_1$ in FIG. 8, i.e., from the interior of the MR head toward the plane opposing to the magnetic recording medium. The magnetic field from the soft magnetic film 19 magnetized in the direction of $A_1$ leads to a magnetic field of direction $A_2$ over the magnetoresistance effect layer 22. The magnetoresistance layer 22 is subjected to a bias magnetic field and magnetized in the direction of "a" in the figure.

The magnetic layer 23 is magnetized in the direction parallel to the plane opposing to the magnetic recording medium, i.e., in the direction indicated by "B" in the figure. Accordingly, the magnetoresistance effect layer 22 is magnetized in the same direction as the magnetic layer 23, i.e., subjected to the magnetic field of the direction indicated by "b" in the figure.

Thus, the magnetoresistance effect film 22 is magnetized in the directions of a and b in the figure, and as a result subjected to a bias magnetic field having the magnetization direction of X.

That is, the MR element 1 used in the MR head according to the present invention is affected by the magnetic field generated in the soft magnetic film 19 magnetized in the aforementioned predetermined direction and can apply a linear bias magnetic field to the magnetoresistance effect layer 22. Moreover, the magnetic layer 23 magnetized in the predetermined magnetization direction is arranged at the both sides of the MR element 1, enabling to control and stabilize the magnetization direction caused by the linear bias magnetic field of the aforementioned magnetoresistance effect layer 22.

It should be noted that as shown in FIG. 3, FIG. 4, and FIG. 7, if the magnetic layer 23 is not formed, the magnetization in the direction of "b" is absent, and the bias magnetic field is applied in the same way as has been described above.

Description will now be directed to preferred embodiments of the present invention with reference to FIG. 9 to FIG. 12. Firstly, explanation will be given on the configuration of the MR head with reference to FIG. 9 and FIG. 10.

Figure 9:
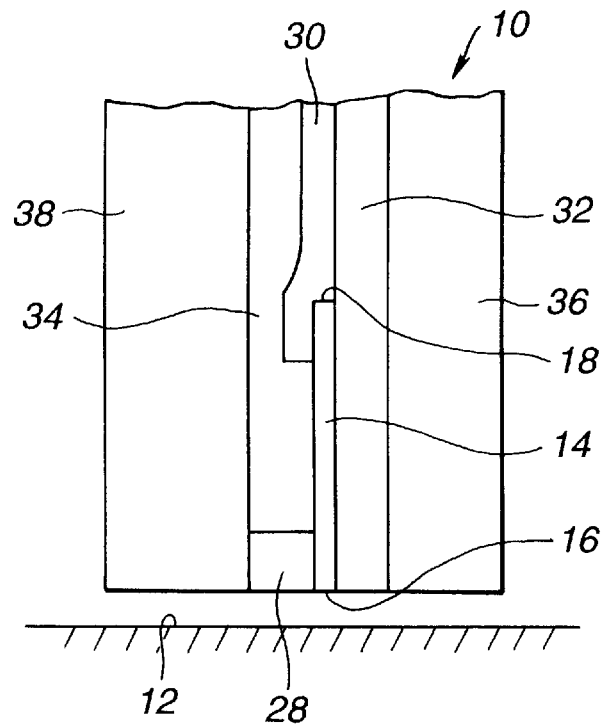
FIG. 9 is a cross sectional view showing the MR head according to the present invention along the magnetic recording track longitudinal direction.
Figure 10:
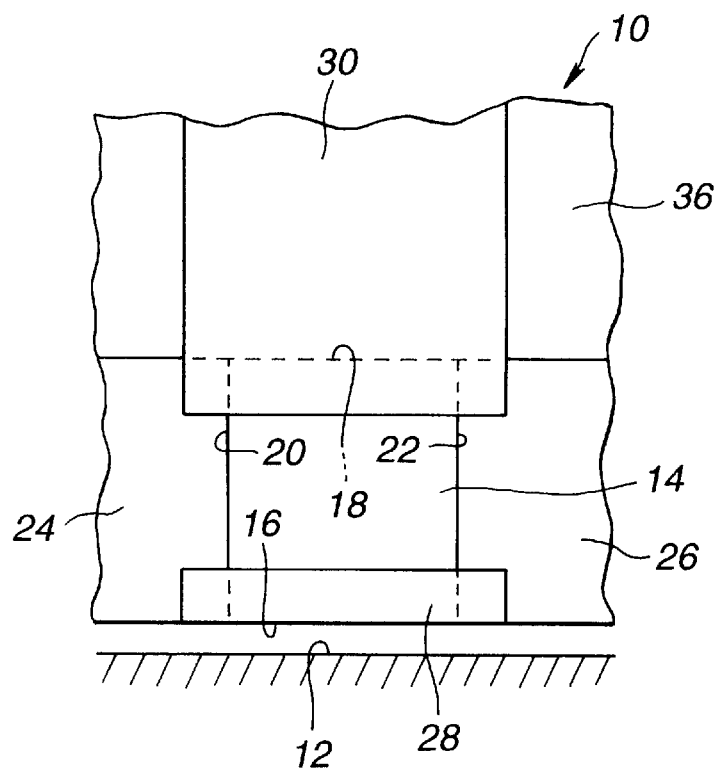
FIG. 10 shows the relative positions of the MR element, the hard film, and the electrode film of the MR head viewed from the magnetic recording track longitudinal direction.

FIG. 9 is a cross sectional view of the MR head according to the present invention cut off with a plane along the longitudinal direction of the magnetic recording track. FIG. 10 shows relative positions of the MR element, the hard film, and the electrode film of the MR head viewed from the longitudinal direction of the magnetic recording track.

FIG. 9 and FIG. 10 show an MR head 10 according to the present invention prepared as a shield type MR head. The MR head 10 shown here is in a state when reading out a recorded data from the magnetic recording track 12 magnetically defined on a magnetic recording medium. That is, the MR head is in a position opposing to the track 12.

The MR head 10 includes an MR element 14 formed as an approximately rectangular thin film element. When the MR head 10 is positioned in the state shown in FIG. 9 and FIG. 10, this MR element 14 has the film surface vertical to the surface of the magnetic recording medium as well as to the longitudinal direction of the track 12.

The approximately rectangular MR element 14 has a lower edge (equivalent to a first edge in claims) 16, an upper edge (equivalent to a second edge in claims) 18 positioned in opposite to the lower edge, and side edges (equivalent to a third edge and a fourth edge in claims) 20 and 22 in the width direction (left and right in FIG. 2) of the track 12.

The MR head 10 is further provided with a pair of hard magnetic films (hard films) 24 and 26 for horizontal bias, each connected to the end face of the side edges 20 and 22 of the MR element 14, and a pair of electrode films, i.e., a lower electrode film 28 and an upper electrode film 30 each connected electrically to the lower edge 16 and the upper edge 18 of the MR element 14.

The electrode films 28 and 30 serve as lead films for supplying a detection current to the MR element 14. As these electrode films 28 and 30 are connected to the upper and lower edges of the MR element 14, this MR head 10 is a longitudinal type MR head.

The MR element 14 and the hard films 24 and 26 are sandwiched between a first gap layer 32 and a second gap layer 34 which are insulation layers. The outside of the first gap is covered by a first shield layer 36 and the outside of the second gap layer 34 is covered by a second shield layer 38.

The lower electrode film 28 is electrically connected to the second shield layer 38 which is further connected electrically to the first shield layer 36.

The first shield layer 36 and the second shield layer 38 have functions identical to those in the conventional shield type MR head, and their explanations will be omitted.

The horizontal bias hard films 24 and 26 are made from a so-called hard magnetic material having a large coercive force because they are magnetized into permanent magnets for applying a magnetic field to fix the magnetization state of the both edges in the width direction of the MR element 14 so as to magnetically stabilize the MR element.

In this embodiment of the present invention, the hard films 24 and 26 are made from a hard magnetic material having a specific resistance of 0.1 Ωcm or above. More specifically, the hard films 24 and 26 were formed from a ferrite material expressed in a general formula $MO-Fe_2O_3$ wherein M represents a di-valent metal. Here, the di-valent metal is a metal or more than one metals selected from a group consisting of Mn, Fe, Co, Ni, Cu, Zn, and Mg.

Especially preferable as the material of the hard films 24 and 26 is, for example, $\gamma$-$Fe_2O_3$ containing Co (often abbreviated as Co—$\gamma Fe_2O_3$) which has a superior chemical stability and a large surface hardness, leading to a superior mechanical durability as well as a high coercive force.

Moreover, the hard films 24 and 26 preferably have a thickness $t_{hard}$ defined as $Br_{hard} \times t_{hard} \geq Ms_{MR} \times t_{MR}$ wherein $Br_{hard}$ represents a residual magnetization of the material of the hard films 24 and 26; $Ms_{MR}$ represents the saturation magnetization of the material of the MR element 14; and $t_{MR}$ represents a thickness of the MR element.

The aforementioned ferrite material used for forming the hard films 24 and 26 exhibit a large electric resistance unlike a metal material having a comparatively small specific resistance such as a Co—Pt alloy and a Co—Cr—Pt alloy used as the conventional hard film material.

Consequently, even if the hard films 24 and 26 are in contact with the lower electrode film 28 and the upper electrode film 30 as shown in FIG. 10, the current flowing from the electrode films 28 and 30 to the hard films 24 and 26 is in the order which can be ignored. In other words, it is substantially prevented that a part of a detection current supplied from the electrode films 28 and 30 to the MR element 14 flows into the hard films 24 and 26.

Moreover, it is also substantially prevented that a part of detection current which has flown into the MR element 14 leads into the hard films 24 and 26.

It should be noted that as will be detailed later, the hard films 24 and 26 are separated from the first gap layer 32 by a backing film made from an antiferromagnetic material which increases the coercive force in the hard films 24 and 26. As the antiferromagnetic material for this backing film, NiO or CoO can be used.

It is also possible to form a backing film from a NaCl crystal type material between the hard films 24 and 26 and the first gap layer 32, so as to increase the crystalline orientation of the hard films 24 and 26. As the backing film material having the NaCl crystal type, it is possible to use MgO, ZnO, NiO, or CoO.

Moreover, a thin film of an antiferromagnetic material is also formed between the hard films 24 and 26 and the MR element 14. This thin film may also be made from NiO or CoO. This thin layer exhibits an effect to increase the horizontal bias magnetic field by way of exchange coupling between the Ni or Co atoms in the antiferromagnetic material and the atoms in the material of the MR element.

Description will now be directed to the method for producing the MR element 14 and the hard films 24 and 26 of the aforementioned longitudinal type MR head 10 with reference to FIG. 11 and FIG. 12.

FIG. 11 shows a method for producing the MR element and hard films of FIG. 9 according to a first embodiment. FIG. 12 shows a method for producing the MR element and hard films of FIG. 9 according to a second embodiment.

In the method according to the first embodiment shown in FIG. 11, firstly, a magnetoresistance film 52 is formed on a substrate 50. The substrate 50 in this figure is a first shield layer 36 where a first gap layer 32 (equivalent to the support layer in claims) is formed to support the MR element 14 and the hard films 24 and 26.

Figure 11A:
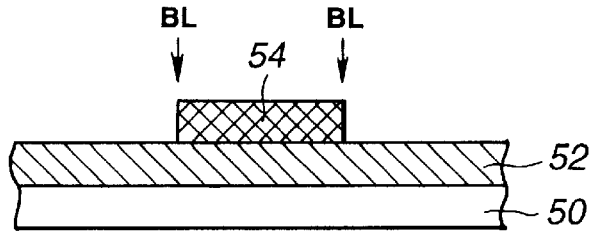
FIG. 11 explains a first specific method for forming the MR element and the hard film of the MR head of FIG. 9 according to a first embodiment of the present invention.

Next, the photolithography technique is used to form a first resist pattern 54 to cover a region corresponding at least to the MR element 14 and to define at least a boundary BL between the MR element 14 and the hard films 24 and 26 (see FIG. 11A).

Figure 11B:
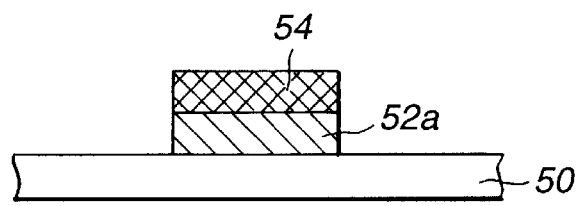

Next, etching is carried out for the first resist pattern 54 so as to remove the portion of the magnetoresistance film 52 not covered by the first resist pattern 54 (see FIG. 11B).

Figure 11C:
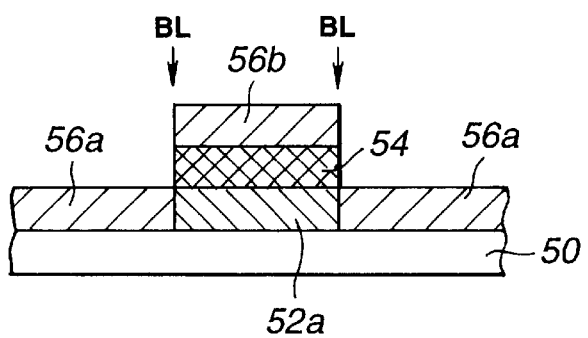

Next, a hard magnetic film (56b covering the first resist pattern 54 and 56a covering the remaining part) having a specific resistance of 0.1 Ωcm or above is formed on the substrate 50 having the magnetoresistance film 52a covered by the first resist pattern 54, so that the magnetoresistance film 52 is bonded to the hard magnetic film 56a at the boundary BL between the MR element 14 and the hard films 24 and 26 (see FIG. 11C). This hard magnetic film 56a and 56b is made from a ferrite material expressed by a general formula $MOFe_2O_3$ wherein M represents a di-valent metal.

It should be noted that in order to form a backing film of an antiferromagnetic material between the hard films 24, 26 and the first gap layer 32, and to form a thin layer of an antiferromagnetic material between the hard films 24, 26 and the MR element 14, a film of NiO or CoO can be formed immediately before forming the hard magnetic film 56a, 56b, so as to simultaneously form the backing film and the thin layer.

Figure 11D:
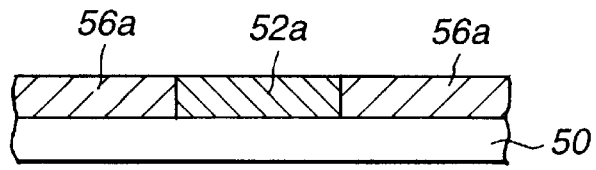

After forming the hard magnetic film 56a, 56b, a lift-off processing is carried out to remove the first resist pattern 54 together with the hard magnetic film 56b formed on the first resist pattern 54 (see FIG. 11D).

Figure 11E:
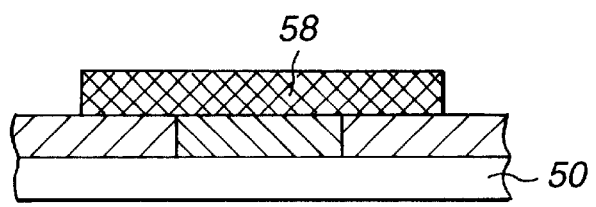

Next, a second resist pattern 58 is formed to cover a region corresponding to the MR element 14 and the hard films 24 and 26 (see FIG. 11E).

Figure 11F:
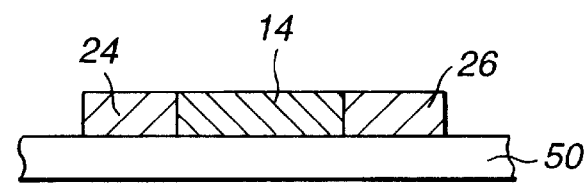

Finally, etching is carried out for the second resist pattern 58 and the resist pattern is removed, thus completing the formation of the MR element 14 and the hard films 24 and 26 (see FIG. 11F).

In the second embodiment shown in FIG. 12, firstly, a hard magnetic film 156 having a specific resistance of 0.1 Ωcm or above is formed on the substrate 50. The material used for this hard magnetic film 156 is a ferrite material expressed in a general formula $MO.Fe_2O_3$ wherein M represents a di-valent metal. The substrate 50 in FIG. 12 is identical to the one explained in FIG. 11.

As has been described above, in order to form a backing film of antiferromagnetic material between the hard films 24, 26 and the first gap layer 32, a film of NiO or CoO is formed on the substrate 50 prior to the formation of the hard magnetic film 156.

Figure 12A:
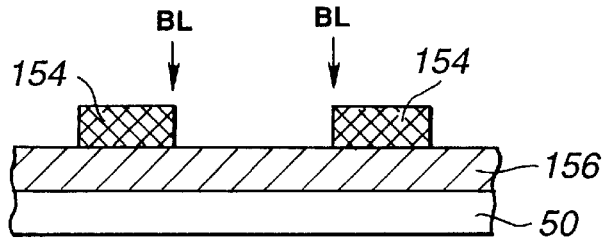
FIG. 12 explains a second specific method for forming the MR element and the had film of the MR head of FIG. 9 according to a second embodiment of the present invention.

Next, the photolithography technique is used to form a first resist patter 154 to cover a region corresponding at least the hard films 24 and 26 and to define at least the boundary BL between the MR element 14 and the hard films 24, 26 (see FIG. 12A).

Figure 12B:
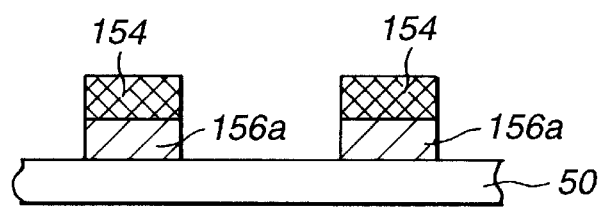

Next, etching is carried out for the first rest pattern 154 to remove the portion of the hard magnetic film 156 not covered by the first resist pattern 154 (see FIG. 12B).

Figure 12C:
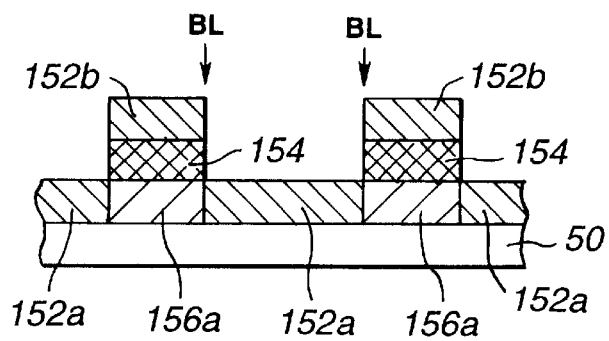

Next, on the substrate 50 having the hard magnetic film 156 covered by the first resist pattern 154, a magnetoresistance material film (152b on the first resist pattern 154, and 152a for the other part) is formed so as to bond the magnetoresistance material film 152a with the hard magnetic material 156a at the boundary BL between the MR element 14 and the hard films 24, 26 (see FIG. 12C).

It should be noted that as has been described above, in order to form a thin layer of antiferromagnetic material at the boundary between the hard films 24, 26 and the MR element 14, it is necessary to form a film of NiO or CoO immediately before the formation of the magnetoresistance material films 152a, 152b. This enables to form a thin layer of the antiferromagnetic material on the sides of the hard magnetic film 156a.

Figure 12D:
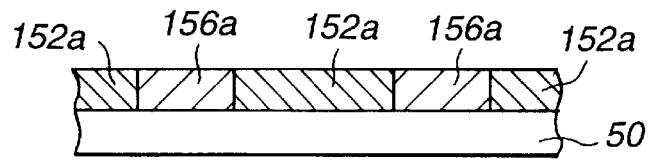

After the formation of the magnetoresistance material films 152a, 152b, the lift-off processing is carried out to remove the first resist pattern 154 together with the magnetoresistance material film 152 on the first resist pattern 154 (see FIG. 12D).

Figure 12E:
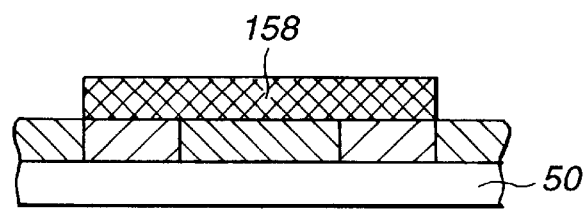

Next, a second resist pattern 158 is formed to cover a region corresponding to the MR element 14 and the hard films 24, 26 (see FIG. 12E).

Figure 12F:
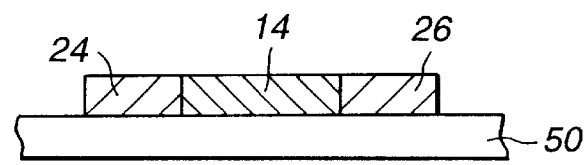

Finally, etching is carried out for the second resist pattern 158 and resist removal is carried out, thus completing the MR element 14 and the hard films 24, 26 as shown in FIG. 12F.

As an example of the hard films 24 and 26, characteristics will be described below for a case using $Co$—$\gamma Fe_2O_3$.

In the method according to the second embodiment shown in FIG. 12, an antiferromagnetic backing film is formed from NiO on the substrate 50. The $Co$—$\gamma Fe_2O_3$ film was formed by way of the reaction sputtering method through the RF magnetron sputtering using an alloy target of Fe–4 weight % Co. The film thickness immediately after the film formation was 93.86 nm and the sheet resistance was 6.71 k$\Omega$/□.

Figure 13:
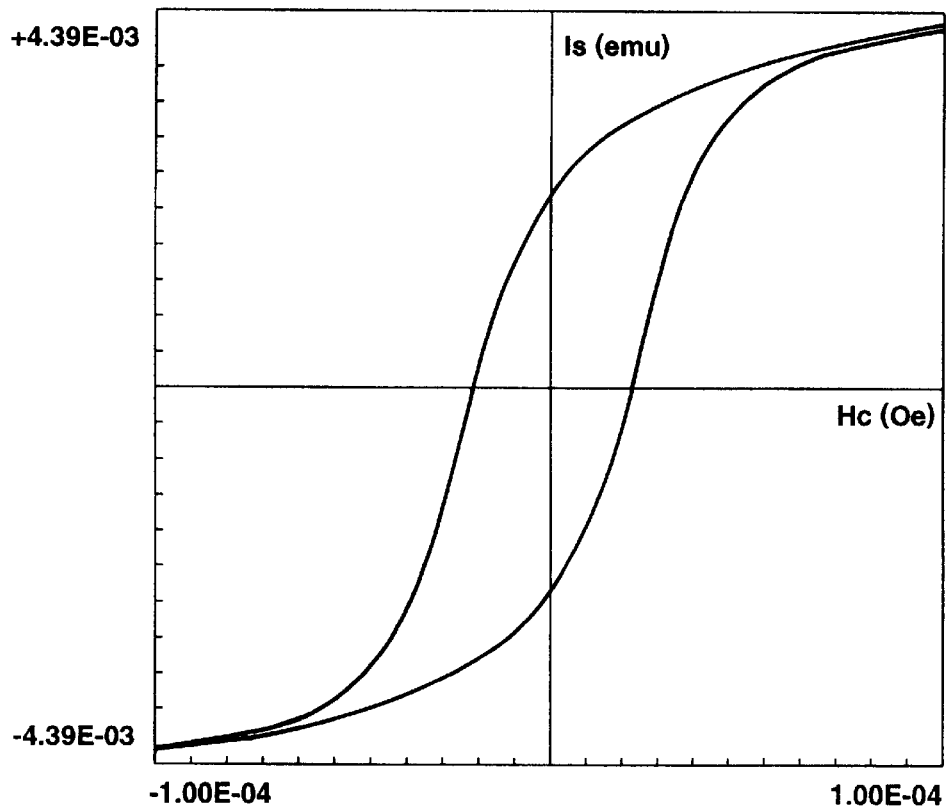
FIG. 13 is a hysterisis loop showing the magnetic characteristic of the hard magnetic material film formed according to the second specific method.

Next, this film was annealed by a temperature of 250° C., for example, in an oxygen or atmosphere, thus obtaining a hard magnetic film 156 having a film thickness of 103.58 nm, sheet resistance of 172 k$\Omega$/x, and specific resistance 1.78 $\Omega$cm. This hard magnetic film 156, as shown in the hysteresis loop of FIG. 13, exhibited the following magnetic characteristics: coercive force Hc=171.6 A/m and saturation magnetization Is=300 emu/cc.

After this, through the patterning of the hard magnetic film 156, formation of the magnetoresistance material film 152a, 152b, and the lift-off step, the MR element and the hard films 24, 26 are formed as shown in FIG. 12F. The magnetoresistance material film 152a, 152b was formed by the sputtering method using the known Ni—Fe alloy. It is also possible to form a GMR (giant magneto resistive) effect film using the spin valve effect. It should be noted that the track width of the MR element 14 was defined to be 1.0 $\mu$m.

Figure 14:
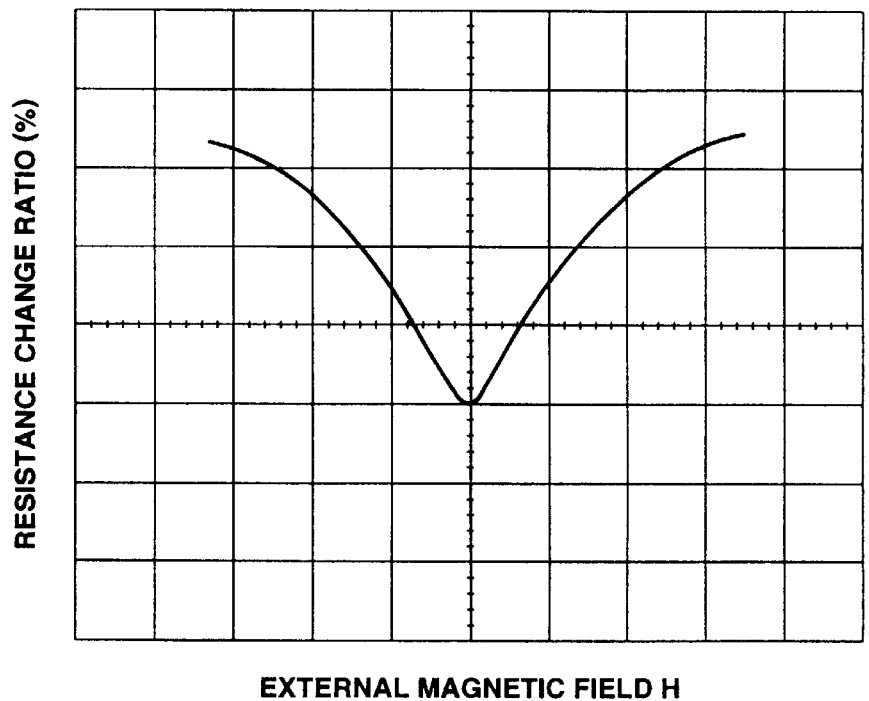
FIG. 14 shows the characteristics of the MR head formed according to the second specific method.

FIG. 14 shows the characteristic of the magnetoresistance head formed through the aforementioned steps. FIG. 14 shows the element characteristic of resistance change ratio (MR ratio) of 2% at the maximum external magnetic field ±13.9 kA/m.

As is clear from FIG. 14, the magnetoresistance effect type head using the hard film of $Co$—$\gamma Fe_2O_3$ shows a stable resistance change without showing the Barkhausen noise or hysteresis.

According to the aforementioned embodiments, in the longitudinal type MR head 10, the hard films 24 and 26 for the horizontal bias have a large resistance and accordingly, the detection current supplied from the electrode films 28 and 30 to the MR element hardly leaks into the hard films 24 and 26. This substantially prevent the sense lowering of the MR element due to the detection current leak which leads to the lowering of the reproduction output of the MR head.

Moreover, as the hard films 24 and 26 are formed from a ferrite material expressed by a general formula $MO$—$Fe_2O_3$ wherein M represents a di-valent metal, it is possible to obtain preferable results.

Moreover, the backing film of the hard films 24 and 26 is made from an antiferromagnetic material such as NiO and CoO, which increases the coercive force in the hard films 24 and 26.

Moreover, a layer of an antiferromagnetic material such as NiO and CoO is formed at the boundary between the hard films 24, 26 and the MR element 14, thus increasing the magnetic field for the horizontal bias.

Because the lift-off method is used for forming the MR element 14 and the hard films 24, 26, it is possible to obtain a close connection between them.

It should be noted that in the aforementioned explanation, the present invention is applied to a shield type MR head. However, the present invention is not limited to the shield type MR head but can be applied to various longitudinal MR heads in which a hard film is used for horizontal bias.

As has been described above, the magnetoresistance effect type magnetic head, i.e., the MR head according to the present invention includes: a magnetic layer magnetized approximately in a vertical direction to a surface opposing a magnetic recording medium; a non-magnetic insulation layer formed on the magnetic layer; and a magnetoresistance effect layer formed on the non-magnetic insulation layer and exhibiting the magnetoresistance effect.

Thus, the bias application method using a bias current is not employed and it is possible to apply a uniform bias magnetic field to this magnetoresistance effect layer without increasing the impedance, thus increasing the reproduction output and enabling to obtain a high quality.

Moreover, in the MR head according to the present invention, the magnetic layer consists of a soft magnetic film and an antiferromagnetic layer so that the magnetization direction of the soft magnetic film is fixed by the antiferromagnetic film. Thus, it is possible to prevent rotation of the magnetization direction of the soft magnetic film due to the magnetic field generated by a sense current. This stabilizes the magnetization direction of the soft magnetic film and as a result it is possible to apply a stable bias magnetic field to the magnetoresistance effect layer.

Furthermore, in the MR head according to the present invention, a magnetic layer is arranged at both sides of the magnetoresistance effect layer so that the magnetic layer prevents a loss of the sense current and nullifies the anti-magnetic field generated at the end of the magnetoresistance effect layer, thus stabilizing the magnetization of the magnetoresistance effect layer, which in turn increases the reproduction output. Here, as the magnetic layer arranged at the both sides of the magnetoresistance effect layer, a magnetic layer of a hard magnetic film is used so as to further increase the reproduction output characteristic.

Moreover, according to the present invention, the MR head includes: an MR element formed as an approximately rectangular thin film element having a first edge positioned in the vicinity of a magnetic recording track, a second edge opposing to this first edge, and third and fourth edges in the width direction of the magnetic recording track; a pair of hard magnetic films each connected to the third and the fourth edges of the MR element, for a horizontal bias; and a pair of electrode films each connected electrically to the first and the second edges of the MR element, wherein the hard magnetic film is formed from a hard magnetic material having a specific resistance of 0.1 $\Omega$cm or above.

Consequently, in the MR head according to the present invention, the detection current supplied to the MR element does not flow into the hard magnetic film to lower the head reproduction output.

Moreover, the MR head according to the present invention includes: an MR element formed as an approximately rectangular thin film element having a first edge positioned in the vicinity of a magnetic recording track, a second edge opposing to this first edge, and third and fourth edges in the width direction of the magnetic recording track; a pair of hard magnetic films each connected to the third and the fourth edges of the MR element, for a horizontal bias; and a pair of electrode films each connected electrically to the first and the second edges of the MR element, wherein the MR element and the hard magnetic film are formed by using a hard magnetic material having a specific resistance of 0.1 $\Omega$cm or above for the hard magnetic film and by employing the lift-off method to form the MR element and the hard magnetic film.

Consequently, the MR element and the hard magnetic film formation method according to the present invention maintains a preferable bonding between the MR element and the hard magnetic film, increasing the effect of the horizontal bias as well as preventing leak of the detection current supplied to the MR element, through the hard magnetic film to lower the head reproduction output.

What is claimed is:

1. A magnetoresistance effect type magnetic head comprising:

a magnetoresistance effect element formed as an approximately rectangular thin film element having a first edge positioned in the vicinity of a magnetic recording track, a second edge opposing to said first edge, and third and fourth edges in the width direction of said magnetic recording track; a pair of hard magnetic films each connected to said third and said fourth edges of said magnetoresistance effect element, for a horizontal bias; and a pair of electrode films each connected electrically to said first and said second edges of said magnetoresistance effect element, wherein said hard magnetic film is formed from a hard magnetic material having a specific resistance of 0.1 $\Omega$cm or above: and said hard magnetic film is made from a ferrite mateiral expressed by a general formula Mo—$Fe_2Q_3$ wherein M represents a di-valent metal.

2. A magnetoresistance effect type magnetic head as claimed in claim 1, wherein said di-valent metal is at least one selected from a group consisting of Mn, Fe, Co, Ni, Cu, Zn, and Mg.

3. A magnetoresistance effect type magnetic head as claimed in claim 1, wherein said ferrite material is $\gamma$-$Fe_2O_3$ containing Co.

4. A magnetoresistance effect type magnetic head as claimed in claim 1, wherein a backing film for said hard magnetic film is formed from an antiferromagnetic material so as to increase the coercive force in said hard magnetic film.

5. A magnetoresistance effect type magnetic head as claimed in claim 1, wherein a backing film for said hard magnetic film is formed from a material having a NaCl crystal type, so as to increase the crystalline orientation of said hard magnetic film.

6. A magnetoresistance effect type magnetic head as claimed in claim 1, wherein a layer of an antiferromagnetic material is formed at the boundary between said hard magnetic film and said magnetoresistance effect element, so as to strengthen the magnetic field for the horizontal bias.

7. A magnetoresistance effect type magnetic head as claimed in one of claim 4 and claim 6, wherein said antiferromagnetic material is one of NiO and CoO.

8. A magnetoresistance effect type magnetic head as claimed in claim 5, wherein said material having the NaCl crystal type is one selected from a group consisting of MgO, ZnO, NiO, and CoO.

* * * * *